(12) United States Patent
Tanaya et al.

(10) Patent No.: US 10,868,793 B2
(45) Date of Patent: Dec. 15, 2020

(54) DYNAMIC QUERY HINTS IN LDAP SEARCH OPERATIONS

(71) Applicant: Oracle International Corporation, Redwood Shores, CA (US)

(72) Inventors: Hitaisinee Himadri Tanaya, Bangalore (IN); Lutfiye Umit Yalcinalp, San Francisco, CA (US); Ashish Kolli, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 141 days.

(21) Appl. No.: 16/204,433

(22) Filed: Nov. 29, 2018

(65) Prior Publication Data

US 2019/0334856 A1 Oct. 31, 2019

(30) Foreign Application Priority Data

Apr. 28, 2018 (IN) .............................. 201841016108

(51) Int. Cl.
*G06F 16/30* (2019.01)
*H04L 29/12* (2006.01)
*G06F 16/903* (2019.01)
*G06F 16/31* (2019.01)
*G06F 16/335* (2019.01)
*G06F 16/84* (2019.01)

(52) U.S. Cl.
CPC ........ *H04L 61/1523* (2013.01); *G06F 16/313* (2019.01); *G06F 16/322* (2019.01); *G06F 16/335* (2019.01); *G06F 16/86* (2019.01); *G06F 16/90348* (2019.01)

(58) Field of Classification Search
CPC .... G06F 16/256; G06F 16/313; G06F 16/322; G06F 16/335; G06F 16/86; G06F 16/90348; H04L 61/1523
See application file for complete search history.

(56) References Cited

U.S. PATENT DOCUMENTS

| 7,233,944 | B2 | 6/2007 | Ahmed |
| 7,702,627 | B2 | 4/2010 | Ahmed et al. |
| 7,945,562 | B2 | 5/2011 | Ahmed et al. |
| 8,352,517 | B2 * | 1/2013 | Park ................. G06F 16/24542 707/809 |
| 9,483,455 | B1 * | 11/2016 | Bastide ............... G06F 16/2282 |

(Continued)

OTHER PUBLICATIONS

J Cranshaw, 'Building a scalable event-level metadata service for ATLAS', p. 1-11. (Year: 2008).*

*Primary Examiner* — Merilyn P Nguyen
(74) *Attorney, Agent, or Firm* — Kilpatrick Townsend & Stockton LLP

(57) ABSTRACT

The present disclosure relates generally to Lightweight Directory Access Protocol (LDAP), and more particularly, to techniques for improving query performance on an LDAP server. One particular technique includes receiving a LDAP query having search criteria, identifying one or more search filters within the search criteria; evaluating one or more mappings for search filter patterns to index query hints based on the identified one or more search filters; identifying one or more query hints based on the evaluation of the one or more mappings; selecting one or more indices based on the one or more query hints; and executing the LDAP query on an LDAP directory using the selected one or more indices.

14 Claims, 7 Drawing Sheets

(56) References Cited

U.S. PATENT DOCUMENTS

| | | | |
|---|---|---|---|
| 9,870,390 B2 | 1/2018 | Ahmed et al. | |
| 10,437,843 B2* | 10/2019 | Nguyen | G06F 16/2471 |
| 10,664,508 B1* | 5/2020 | Laurence | G06F 16/903 |
| 2004/0243576 A1* | 12/2004 | Shrivastava | G06F 16/24534 |
| 2009/0132479 A1* | 5/2009 | Manson | G06F 16/2282 |
| 2010/0250518 A1* | 9/2010 | Bruno | G06F 16/24 |
| | | | 707/718 |
| 2015/0220583 A1* | 8/2015 | Teletia | G06F 16/245 |
| | | | 707/696 |
| 2017/0132286 A1* | 5/2017 | Baranczyk | G06F 16/24545 |
| 2018/0285416 A1* | 10/2018 | Bestfleisch | G06F 16/24552 |

\* cited by examiner

DYNAMIC QUERY HINTS IN LDAP SEARCH OPERATIONS

CROSS-REFERENCE TO RELATED APPLICATION

The present application claims the benefit and priority of India Provisional Application No. 201841016108, filed Apr. 28, 2018 entitled "SYSTEMS AND METHODS FOR PERFORMING LDAP QUERIES," the entire contents of which are incorporated herein by reference for all purposes.

FIELD OF THE INVENTION

The present invention relates to Lightweight Directory Access Protocol (LDAP), and in particular to techniques for improving query performance on an LDAP server.

BACKGROUND

Lightweight Directory Access Protocol (LDAP) is a directory service protocol for enabling users to locate organizations, individuals, and other resources such as files and devices in a network, whether on the public Internet or on a corporate intranet. In a network, a directory service tells a user where in the network something is located. Directory services play an important role in developing intranet and Internet applications by allowing the sharing of information about users, systems, networks, services, and applications throughout the network. As examples, directory services may provide any organized set of records, often with a hierarchical structure, such as a corporate email directory. Similarly, a telephone directory may be presented as a list of subscribers with an address and a phone number.

LDAP is a commonly used technology for storing corporate users, groups and credentials within organizations, and allows a user to search for an individual without knowing where they're located (although additional information will help with the search). An LDAP directory is commonly organized in a hierarchical structure comprising one or more levels. The one or more levels may include a root directory (the starting place or the source of the tree), which may branch out to countries, each of which may branch out to organizations (divisions, departments, and so forth), which may branch out further to organizational units, which may branch out even further to individuals (which includes people, files, and shared resources such as printers). A user starts an LDAP session by connecting to an LDAP server, called a Directory System Agent (DSA). The user then sends an operation request to the server, and the server sends responses in return. Common operations that a user may request include: starting a secure connection, authenticate and specify an LDAP protocol version, queries for and/or retrieve directory entries, compare whether an entry has a given attribute, add a new entry, delete an entry, modify an entry, abandon a previous request, and unbind or close the connection.

Query operations that pertain to user and group look up constitute about 90% of the queries performed using LDAP, and the response time of the directory server replying to the query should be optimized especially when the system needs to provide quick access to directory data in order to meet access and authorization needs of enterprise and cloud applications. However, expensive or inefficient LDAP queries coming in from various client applications are typical problems for a directory server. Similar to relational database management system, deployments often look for techniques to improve query performance for commonly used queries based on their deployment data. Traditional relational databases make use of various techniques to improve query performance. However, such techniques are generally not applicable in LDAP. Therefore, techniques for improving query performance on an LDAP server continue to be a priority and are desired.

BRIEF SUMMARY

Systems, methods and computer-readable memory for improving query performance on an LDAP server are described. Certain techniques are described for intelligently selecting indices used to execute an LDAP query based on statistics that are representative of the underlying data.

In various embodiments, a method is provided that comprises receiving, by a data processing system, a Lightweight Directory Access Protocol (LDAP) query comprising search criteria; identifying, by the data processing system, one or more search filters within the search criteria; evaluating, by the data processing system, one or more mappings for search filter patterns to index query hints based on the identified one or more search filters; identifying, by the data processing system, one or more query hints based on the evaluation of the one or more mappings; selecting, by the data processing system, one or more indices based on the one or more query hints; and executing, by the data processing system, the LDAP query on an LDAP directory using the selected one or more indices.

In some embodiments, the evaluating the one or more mappings comprises identifying one or more attribute values or substring values in the one or more search filters and matching the one or more attribute values or substring values to a search filter pattern of the one or more mappings.

In some embodiments, the identifying the one or more query hints comprises using a mapping for the search filter pattern to the one or more query hints.

In some embodiments, the method further comprises configuring, by the data processing system, the one or more query hints for the one or more indices, wherein the one or more query hints are linked via coding to the search filter pattern of the mapping, obtaining, by the data processing system, results for the LDAP query based on the executing the LDAP query, wherein the results include one or more entries from the LDAP directory; and forwarding, by the data processing system, the results to a client.

In some embodiments, the configuring is performed at design time as part of the data processing system configuration by an administrator or machine learning component. In other embodiments, the configuring is performed at run time by assigning hint programmatically in code of an LDAP control portion of the data processing system by an administrator or machine learning component.

In various embodiments, a system is provided that comprises a Lightweight Directory Access Protocol (LDAP) system that includes one or more processors and non-transitory machine readable storage medium having instructions stored thereon that when executed by the one or more processors cause the one or more processors to perform a process comprising: receiving, by a LDAP server, a LDAP query comprising search criteria; identifying, by the LDAP server, one or more search filters within the search criteria; evaluating, by the LDAP server, one or more mappings for search filter patterns to index query hints based on the identified one or more search filters; identifying, by the LDAP server, one or more query hints based on the evaluation of the one or more mappings; selecting, by the LDAP server, one or more indices based on the one or more query hints; and executing, by the LDAP server, the LDAP query on an LDAP directory using the selected one or more indices.

In some embodiments, the evaluating the one or more mappings comprises identifying one or more attribute values or sub string values in the one or more search filters and matching the one or more attribute values or sub string values to a search filter pattern of the one or more mappings.

In some embodiments, the identifying the one or more query hints comprises using a mapping for the search filter pattern to the one or more query hints.

In some embodiments, the process further comprises configuring, by the LDAP system, the one or more query hints for the one or more indices, wherein the one or more query hints are linked via coding to the search filter pattern of the mapping, obtaining, by the LDAP server, results for the LDAP query based on the executing the LDAP query, wherein the results include one or more entries from the LDAP directory; and forwarding, by the LDAP server, the results to a client.

In some embodiments, the configuring is performed at design time as part of the data processing system configuration by an administrator or machine learning component. In other embodiments, the configuring is performed at run time by assigning hint programmatically in code of an LDAP control portion of the data processing system by an administrator or machine learning component.

In various embodiments, a non-transitory machine readable storage medium having instructions stored thereon that when executed by one or more processors cause the one or more processors to perform a method comprising: receiving a Lightweight Directory Access Protocol (LDAP) query comprising search criteria; receiving a LDAP query comprising search criteria; identifying one or more search filters within the search criteria; evaluating one or more mappings for search filter patterns to index query hints based on the identified one or more search filters; identifying one or more query hints based on the evaluation of the one or more mappings; selecting one or more indices based on the one or more query hints; and executing the LDAP query on an LDAP directory using the selected one or more indices.

In some embodiments, the evaluating the one or more mappings comprises identifying one or more attribute values or sub string values in the one or more search filters and matching the one or more attribute values or substring values to a search filter pattern of the one or more mappings.

In some embodiments, the identifying the one or more query hints comprises using a mapping for the search filter pattern to the one or more query hints.

In some embodiments, the method further comprises configuring the one or more query hints for the one or more indices, wherein the one or more query hints are linked via coding to the search filter pattern of the mapping, obtaining results for the LDAP query based on the executing the LDAP query, wherein the results include one or more entries from the LDAP directory; and forwarding the results to a client.

In some embodiments, the configuring is performed at design time as part of the data processing system configuration by an administrator or machine learning component. In other embodiments, the configuring is performed at run time by assigning hint programmatically in code of an LDAP control portion of the data processing system by an administrator or machine learning component.

DETAILED DESCRIPTION

Figure 1:
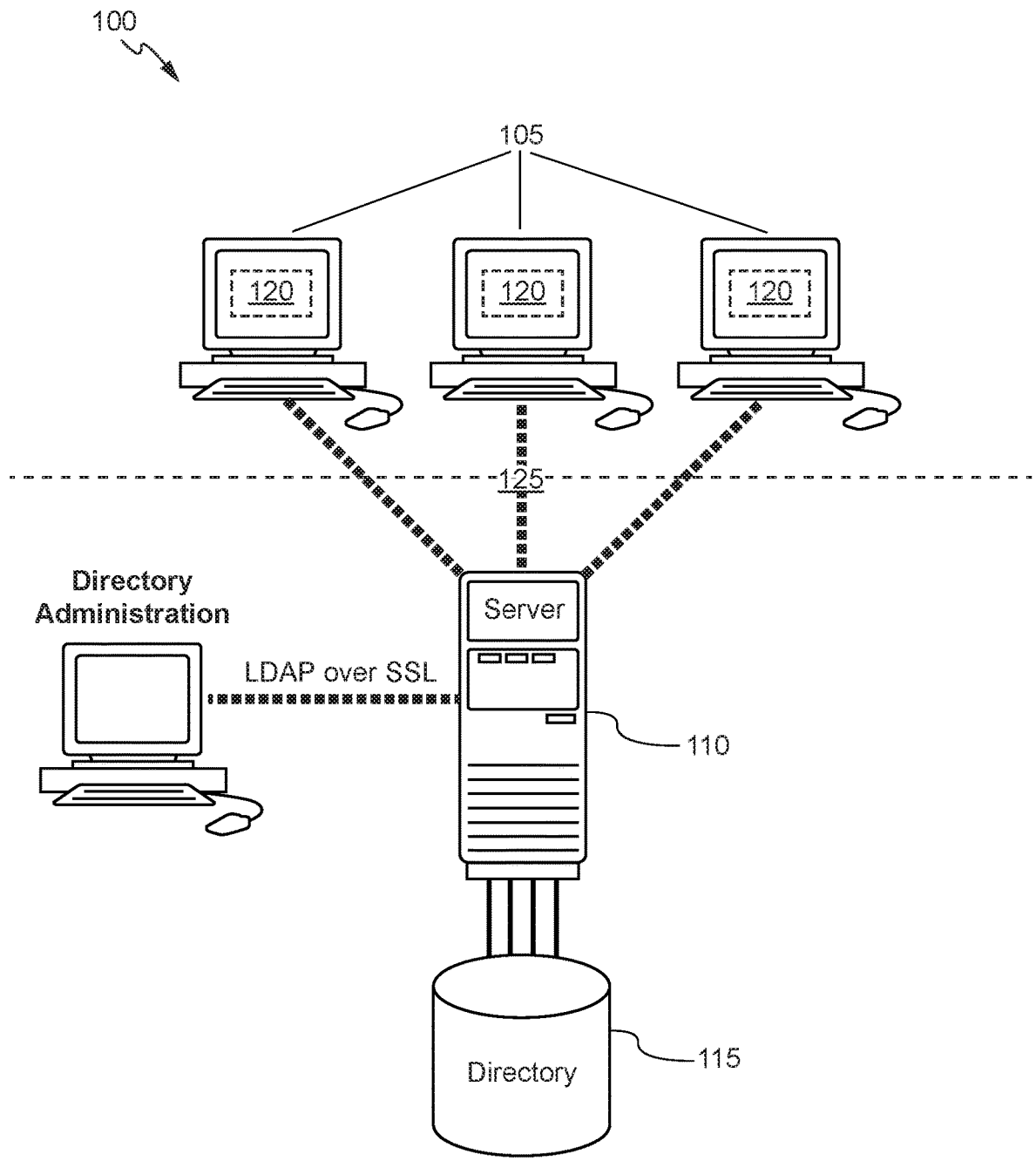
FIG. 1 shows a block diagram of an LDAP system in accordance with various embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

INTRODUCTION

A directory service is a customizable information store that functions as a single point from which users can locate resources and services distributed throughout a network, and is commonly the backbone of many organizations. LDAP is a service protocol used within a directory service to authenticate, search, and create/modify entities, typically corporate users, groups and application data. LDAP performance is important to a successful deployment of a directory service. Expensive or inefficient LDAP queries coming in from various client applications are typical problems for a directory server. For example, many times clients provide queries that are not written correctly and poor LDAP query performances are often attributed to the lack of intelligence in selecting the right index for a given query.

An index is a mechanism used by the LDAP directory server database that can be used to efficiently find entries matching search criteria. As used herein, an "index" maps to a subset of entries of all the entries in the LDAP directory, which allows searches or queries to be run on subsets of data in a more efficient manner. More specifically, each index maps a key (e.g., 1=location1) to an ID list, which is the set of entry IDs for the entries (e.g., all entries with location1) that match that index key. Normally in LDAP there are three basic index types implemented: (i) equality or value indices are used to identify entries containing an attribute value that exactly matches a given assertion value, (ii) presence indices are used to identify entries that contain at least one value for a given attribute, and (iii) substring indices are used to identify entries that contain an attribute value matching a given substring assertion. The various LDAP server implementations may have other customizable indices such as approximate indices, extensible match indices, and ordering indices. Attributes hold the data for an entry. Each attribute has an attribute type, zero or more attribute options, and a set of values that comprise the actual data. Attribute types are schema elements that specify how attributes should be treated by LDAP clients and servers. All attribute types typically have an object identifier (OD) and zero or more names that can be used to reference attributes of that type. They may also have an attribute syntax, which specifies the type of data that can be stored in attributes of that type, and a set of matching rules, which indicate how comparisons should be performed against values of attributes of that type. Attribute types may also indicate whether an attribute is allowed to have multiple values in the same entry, and whether the attribute is intended for holding user data (a user attribute) or is used for the operation of the server (an operational attribute). Operational attributes are typically used for configuration and/or state information.

LDAP directory servers typically have their own built-in code logic to select the indices and execute underlying queries to fetch data from the storage layer based on received search criteria. Commonly the LDAP directory server selects the indices to use for a given query simply based on the filter(s) presented in the search criteria. Search filters are used to define criteria such as attributes or types of attributes for identifying entries that contain certain kinds of information. Thereafter, the LDAP directory executes the search operation on the directory using the selected indices in a sequential (e.g., based on the order of filters in the search criteria) or randomly (e.g., simply picking and choosing indices randomly without intelligence). However, this type of index selection and execution does not work well when more than one index needs to be selected and executed for a given query. For example, the LDAP directory servers typically select the indices in a sequential or random order for execution based on the filter(s) presented in the search criteria; however, some indices perform better first rather than last, some indices perform better last rather than first, some indices perform better after or before another index, etc. in an execution strategy. Consequently, it should be understood that intelligent selection of the indices in an execution strategy could improve query performance. Nonetheless, conventional solutions to improve query performance are not typically directed to improving the capability of the LDAP directory servers to select the right indices in an execution strategy for the received search criteria. Instead, conventional solutions rely on underlying database tuning techniques and local in-memory caching to achieve better query performance.

To address these problems and provide an improved system to intelligently select the indices for a given query, a method is provided comprising collecting, by a data processing system such as a directory server, statistics concerning indices used to service LDAP queries; receiving, by the data processing system, a LDAP query comprising search criteria; identifying, by the data processing system, one or more search filters within the search criteria; determining, by the data processing system, candidate indices from the indices based on the identified one or more search filters; using, by the data processing system, a comparator to sort the candidate indices based on the statistics; evaluating, by the data processing system, the candidate indices based on the comparator; selecting, by the data processing system, one or more indices from the candidate indices based on the evaluation; and executing, by the data processing system, the LDAP query on an LDAP directory using the selected one or more indices. As used herein, when an action is "triggered by" or "based on" something, this means the action is triggered or based at least in part on at least a part of the something. By implementing index statistic gathering within the directory server, the directory server can decide which indices would be optimal to use rather than choosing indices based simply on the incoming search filter. When there is a choice between multiple indices, query performance would be better when the index that finds the smallest number of entries is used. Advantageously, this new approach would improve query performance in large scale deployments since the index selection is based on real data present in the indices.

LDAP System

FIG. 1 is a block diagram that illustrates an example system 100 in which a client device 105 interacts with an LDAP server 110 in order to retrieve search results from an LDAP directory 115, according to various embodiments. Examples of client device 105 include, without restriction, a workstation, personal computer (PC), laptop computer, smart phone, wearable computer, or other networked electronic device. An interface presented at device 105 may be accessible using an application, e.g., client application 120 executing on device 105. In system 100, the LDAP directory 115 is communicatively coupled to the LDAP server 110, which is communicatively coupled to a communication network 125, to which the client device 105 is also communicatively coupled. Examples of communication networks may include a mobile network, a wireless network, a cellular network, a local area network (LAN), a wide area network (WAN), other wireless communication networks, or combinations thereof. Thus, a user can use the interface of the client application 120 to interact with the LDAP server 110 by sending LDAP operations to, and receiving LDAP search results from, the LDAP server 110 over communication network 125. In response to receiving an LDAP operation from the client application 120, the LDAP server 110 executes that operation relative to the LDAP directory 115 in order to retrieve search results from LDAP directory 115, which LDAP server 110 then returns to client application 120 over communication network 125.

According to various embodiments, the client application 120 can specify an LDAP search operation. A search operation can be used to retrieve partial or complete copies of entries matching a given set of criteria. The elements of an LDAP search request may include a search base such as an entry's distinguished name, often referred to as a DN. The DN uniquely identifies an entry and its position in the directory information tree (DIT) hierarchy. The DN of an LDAP entry is much like the path to a file on a file system. The LDAP search request may further include a search scope. The search scope specifies the portion of the target subtree that should be considered. Supported search scope values may include, for example, base Object (indicates that only the entry specified as the search base should be considered), singleLeve (indicates that only the immediate children of the entry specified as the search base should be considered), wholeSubstree (indicates that the entry specified as the search base, and all of its subordinates to any depth, should be considered), and suboridnateSubtree (indicates that the entry specified by the search base should not be considered, but all of its subordinates to any depth should be considered. The LDAP search request may further include a filter for the search. The filter specifies criteria to use to identify which entries within the scope should be returned. In some embodiments, an LDAP search request includes other parameters such as a size limit for the search, a time limit for the search, a typeOnly flag, and a set of attributes to request for inclusion in entries that match the search criteria and are returned to the client device 105.

In various embodiments, the client application 120 can send, to the LDAP server 110, an LDAP search operation that specifies search criteria including one or more parameters such as a search base, a search scope, and a search filter. In some embodiments, the receipt of the LDAP search operation causes the LDAP server 110 to interpret these parameters in the following manner in its execution of the search operation relative to LDAP directory 115. The LDAP server 110 can interpret the value of the search base parameter to identify the particular LDAP directory entry at which the search operation is to be started. LDAP server 110 can interpret the value of the search scope parameter to identify the "depth," or the quantity of "levels," to which the LDAP directory entries are to be followed in compiling the search results. Put another way, LDAP server 110 can interpret the value of the scope parameter to identify the maximum number of "links" away from the base LDAP directory entry that LDAP server 110 is permitted to follow in compiling the search results. As used herein, "links" refers to relations that exist due to a reference in one LDAP entry to another LDAP entry; "links" does not refer to the hierarchical relationships between LDAP entries that inherently exist due to the LDAP directory's structure. LDAP server 110 can interpret the value of the search filter parameter to identify criteria that an LDAP directory entry should satisfy in order to be included in the search results. Thus, even if a particular LDAP directory entry falls within the specified search scope, that particular LDAP directory entry can be excluded from the search results if the values of that particular LDAP directory entry's attributes fail to satisfy the criteria that the search filter parameter specifies.

In some embodiments, upon or during interpretation of the parameters by the LDAP server 110, the LDAP server 110 selects indices that can be used to efficiently find entries matching the search criteria. An index maps a key to an entry ID list, which is the set of entry IDs for the entries that match that index key. The entry ID list is used as the value of a directory server index, and contains a set of entry IDs for all entries that match the associated index key. An entry ID is a value that is used to uniquely identify an entry in the LDAP directory 115. Although the entry's DN could be used for this purpose, normally the numeric entry ID is much more compact and more efficient to decode, so may be more appropriate for indexing. In some embodiments, the index is a key value pair, where the key is the attribute value or substring value that is indexed, and the value is the list of entry IDs matching that particular given value.

In some embodiments, when the LDAP server 110 receives a valid, authorized search operation, the LDAP server 110 executes the search operation relative to the LDAP directory 115 based on the interpreted search criteria and selected indices in order to identify any entries within the specified scope and that optionally match the given filter. All of those entries (or at least those that the user has permission to retrieve) will be returned to the client device 105 in search result entry messages. Each search result entry message will include the DN of the matching entry, along with zero or more of the attributes contained in that entry, based on the set of requested attributes from the search request and the set of attributes that the requester has permission to retrieve. If the search request had a typesOnly value of true, then those attributes will be returned without their values; otherwise the attributes will be returned with all values that the requester has permission to retrieve.

Dynamic Query Hints in LDAP Search Operations

LDAP query performances in a directory server (e.g., the LDAP server 110 discussed with respect to FIG. 1) can be improved by optimizing the selection of the indices from the underlying storage layer. A directory server implementation is aware of how the underlying database (e.g., the LDAP directory 115) is structured and designed. By introducing dynamic query hint techniques to a directory server, it gives a directory server the ability to override which database indices to use at runtime based on the deployment specific data for processing the LDAP query. A directory server can provide performance improvements in large deployments by providing mappings for search filter patterns to index hints through configurations. These hint patterns can be configured as part of the directory server configuration by administrators. The hints may also be passed in runtime through a new filter to query hint LDAP control (assign hints programmatically in the code of the LDAP control). Advantageously, using the query hints to perform LDAP searches provides administrators flexibility to tune slow LDAP queries based on the deployment data.

Figure 2:
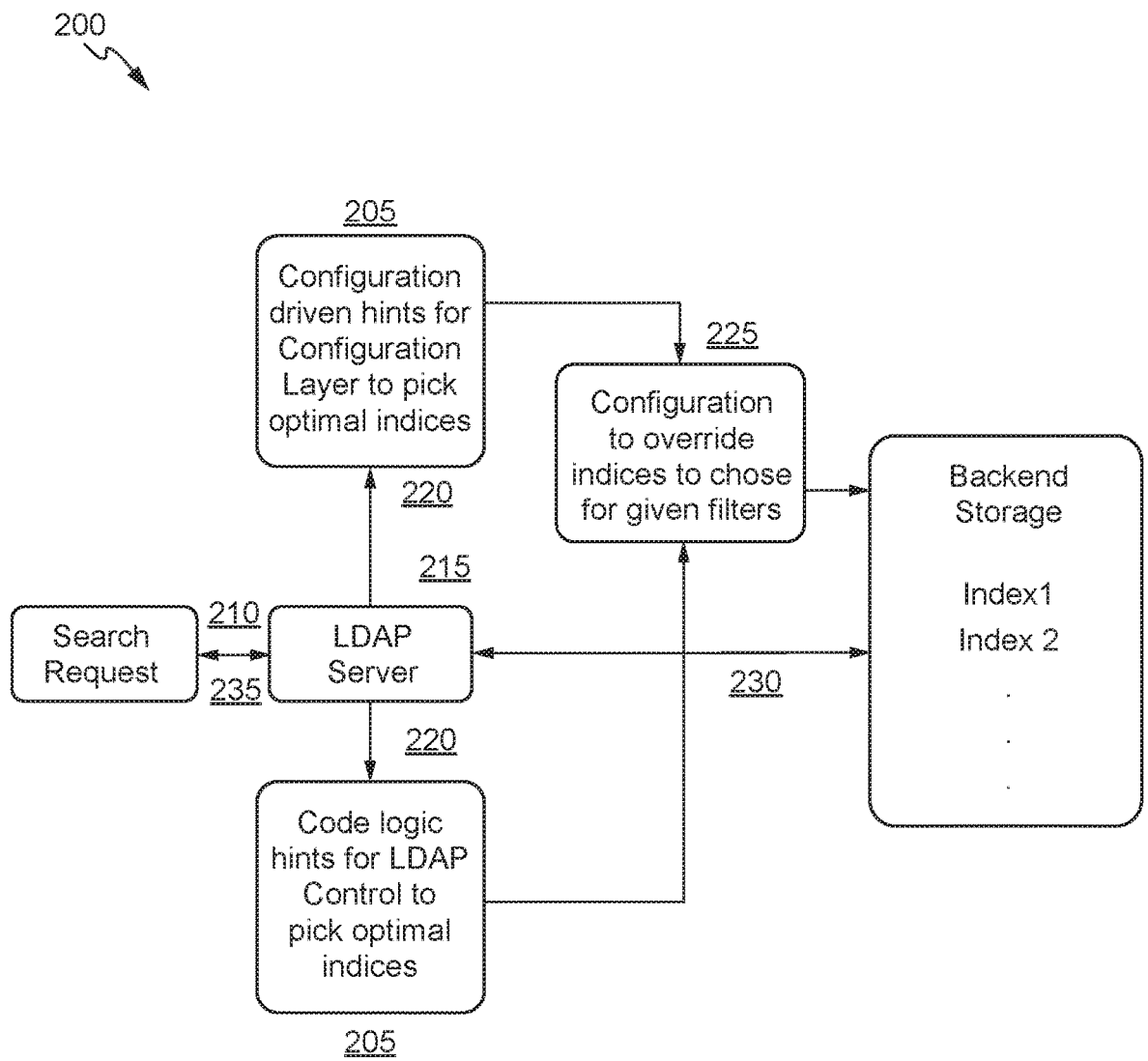
FIG. 2 shows a block diagram for configuring query hints and executing a LDAP search request based on the query hints in accordance with various embodiments.

In various embodiments, in order to select the optimal indices, the directory server implements a query hints feature based on the directory server's internal database and schema design. FIG. 2 shows a block diagram 200 of an LDAP framework for selecting indices based on query hints and executing a LDAP search request using those indices in accordance with various aspects. At step 205, the directory server may provide an ability to configure a filter pattern and specify which indices to pick at runtime for a given LDAP search filter based on the underlying deployment data. In some embodiments, the directory server's schema design may be updated or changed to accommodate the use of query hints. For example, a new configuration such as ds-cfg-query-hints may be added to a backend configuration objectclass such as 'ds-cfg-db-local-backend-workflow-element' objectclass, which is used in the configuration layer to provide expression based filter matching hints. The schema change may include the following attributes and objects:
attributeTypes: (1.3.6.1.4.1.26027.2.1.900
   NAME 'ds-cfg-query-hints'
   SYNTAX 1.3.6.1.4.1.1466.115.121.1.15
   X-ORIGIN 'Oracle Unified Directory')
objectClasses: (1.3.6.1.4.1.26027.1.2.241
   NAME 'ds-cfg-db-local-backend-workflow-element'
   SUP ds-cfg-local-backend-workflow-element
   STRUCTURAL
   MUST ds-cfg-db-directory
   MAY (ds-cfg-index-entry-limit $ . . . <existing attributes>
     $ ds-cfg-query-hints)

In some embodiments, the new configuration may be introduced to the scheme by an administrator. In other embodiments, the new configuration may be introduced to the scheme automatically by the directory server using a machine learning component.

Once the directory server's schema has been updated or changed to accept query hints, query hints can be added to a configuration layer of the directory server to provide expression based filter matching hints. The query hints identify for the directory server which indices to pick at runtime for a given LDAP search filter based on a filter pattern for the given LDAP filter. For example, a query hint may be added in the configuration layer using the following syntax for a first Pattern (1): ds-cfg-query-hints: uid;\(\&\ (cn=\*\)\(uid=[\w   \!\"\#\$\%\&\'\(\)\+\,\-\.\/\:\;\<\|=\>\?\ [\\\}\'\_\{\|\}\~]+\)\). This syntax means that the directory server is configured to use the index "uid" if the LDAP search filter is of the form: "(&(cn=*)(uid=<value>)". Additionally or alternatively, a query hint may be configured in the configuration layer using the following syntax for a second Pattern (2): ds-cfg-query-hints: givenName;\(\&\(\l\(1=sunnyvale\)\ (1=san antonio\)\)\(givenname=[\w \!\"\#\$\%\&\'\(\)\+\,\-\.\/\:\;\<\=\>\?\[\\\]\^\_\{\|\}\~]+\*\)\). This syntax means that the directory server is configured to use the index "givenName" if the LDAP search filter is of the form: "(&(|(1=sunnyvale)(1=san antonio)) (givenname=<value>)))". In some embodiments, the hints and pattern may be introduced to the configuration layer by an administrator. In other embodiments, the hints and pattern may be introduced to the configuration layer by the directory server using a machine learning component The following syntax shows how the configuration layer of the directory server may be configured to use more than one hint for multiple indices: ds-cfg-query-hints: st,ou; <filter_pattern>. Note that the indices to be used for the filter_pattern are st and ou, which are separated by a comma. As should be understood, additionally indices could be added with commas in between each indices to be used. Moreover, as should be understood, multiple indices and patterns may be added to the configuration layer in order to configure the directory serve for optimal index selection. For example, the configuration layer may include the following configuration for selecting indices "uid" and "givenName" based on respective patterns:

dn: cn=userRoot,cn=Workflow Elements,cn=config
objectClass: ds-cfg-local-backend-workflow-element
objectClass: ds-cfg-workflow-element
objectClass: ds-cfg-db-local-backend-workflow-element
objectClass: top
ds-cfg-db-evictor-lru-only: true
ds-cfg-preload-time-limit: 0 seconds
ds-cfg-entries-compressed: false
ds-cfg-db-cleaner-min-utilization: 50
ds-cfg-db-directory-permissions: 700
ds-cfg-db-logging-file-handler-on: true
ds-cfg-db-log-file-max: 100 megabytes
ds-cfg-db-evictor-nodes-per-scan: 10
ds-cfg-compact-encoding: true
ds-cfg-db-checkpointer-bytes-interval: 20 megabytes
ds-cfg-db-logging-level: CONFIG
ds-cfg-db-checkpointer-wakeup-interval: 30 seconds
ds-cfg-disk-full-threshold: 20 megabytes
ds-cfg-disk-low-threshold: 100 megabytes
ds-cfg-db-directory: db
ds-cfg-base-dn: dc=example,dc=com
ds-cfg-db-txn-durability: write-to-filesystem
cn: userRoot
ds-cfg-enabled: true
ds-cfg-db-run-cleaner: true
ds-cfg-java-class: org.opends.server.workflowelement.localbackend.DBLocalBackendWorkflowElement
ds-cfg-index-entry-limit: 100000
ds-cfg-writability-mode: enabled
ds-cfg-query-hints: uid;\(\&\(cn=\*\)\(uid=[\w \!\"\#\$\%\&\'\(\)\+\,\-\.\/\:\;\<\=\>\?\[\\\]\^\_\{\|\}\~]+\)\)
ds-cfg-query-hints: givenName;\(\&\(\l\(1=sunnyvale\)\ (1=san antonio\)\)\(givenname=[\w \!\"\#\$\%\&\'\(\)\+\,\-\.\/\:\;\<\=\>\?\[\\\]\^\_\{\|\}\~]+\*\)\)

In various embodiments, the configuration code changes are made on the backend and in the configuration layer at design time to override the conventional index selection logic during search at run time. In other embodiments, logic code changes are made to the LDAP control at runtime to override the conventional index selection logic during search at run time. In both instances, the code changes may be made dynamically or as deployment data changes overtime. Accordingly, instead of the directory server selecting indices in a sequential (e.g., based on the order of filters in the search criteria) or randomly (e.g., simply picking and choosing indices randomly without intelligence) in accordance with conventional logic, the directory server uses the hints within the code changes to intelligently select indices for executing the LDAP query. In some embodiments, if query hints are present in the configuration layer and the search filter does not match a pattern associated with a query hint, then index selection choice is made from the conventional logic (e.g., sequentially or randomly). Alternatively, if query hints are present in the configuration layer and the search filter does match a pattern associated with a query hint, then index selection choice is made from the hint. Alternatively, if query hints are present in the configuration layer and the one or more search filters do match a pattern associated with a query hint and one or more search filters do not match a pattern associated with a query hint, then index selection choice is made based on a combination of the conventional logic and from the query hint. Alternatively, if query hints are not present in the configuration layer, then index selection choice is made from the conventional logic (e.g., sequentially or randomly). Alternatively, if query hints are not present in the configuration layer but LDAP control is modified automatically or by an administrator to implement a query hint and the search filter does match a pattern associated with a query hint, then index selection choice is made from the hint.

At step 210, a search request or operation may be received by the directory server. In some embodiments, the search request is received from one or more client devices. In some embodiments, the search request specifies search criteria including one or more parameters such as a search base, a search scope, and a search filter. At step 215, the receipt of the search request causes the directory server to interpret the one or more parameters manner in its execution of the search operation relative to the directory (e.g., the LDAP directory 115). For example, the directory server can interpret the value of the search base parameter to identify the particular directory entry at which the search operation is to be started. Additionally, the directory server can interpret the value of the search filter parameter to identify criteria that a directory entry should satisfy in order to be included in the search results.

At step 220, the directory server selects one or more indices that can be used to efficiently find entries matching the search criteria. In some embodiments, the directory server identifies one or more hints to select the one or more indices. In certain embodiments, the one or more hints are identified from the one or more parameters. For example, the hints may be identified from the search filter parameter(s) based on a mapping between the search filter and one or more filter patterns associated with hints, respectively. At step 225, the directory server executes the search operation relative to the directory using at least the identified one or more indices. At step 230, the directory server obtains results of the search operation from the directory. In some embodiments, the results of the search operation include a number of entries that satisfy the identified indices. At step 235, the directory server returns, to the client, as a search result, a set of entries, assuming that the set of entries satisfy the search criteria, for example, are within the specified scope and satisfy the specified filter.

Methods for LDAP Query Optimization with Dynamic Query Hints

Figure 3:
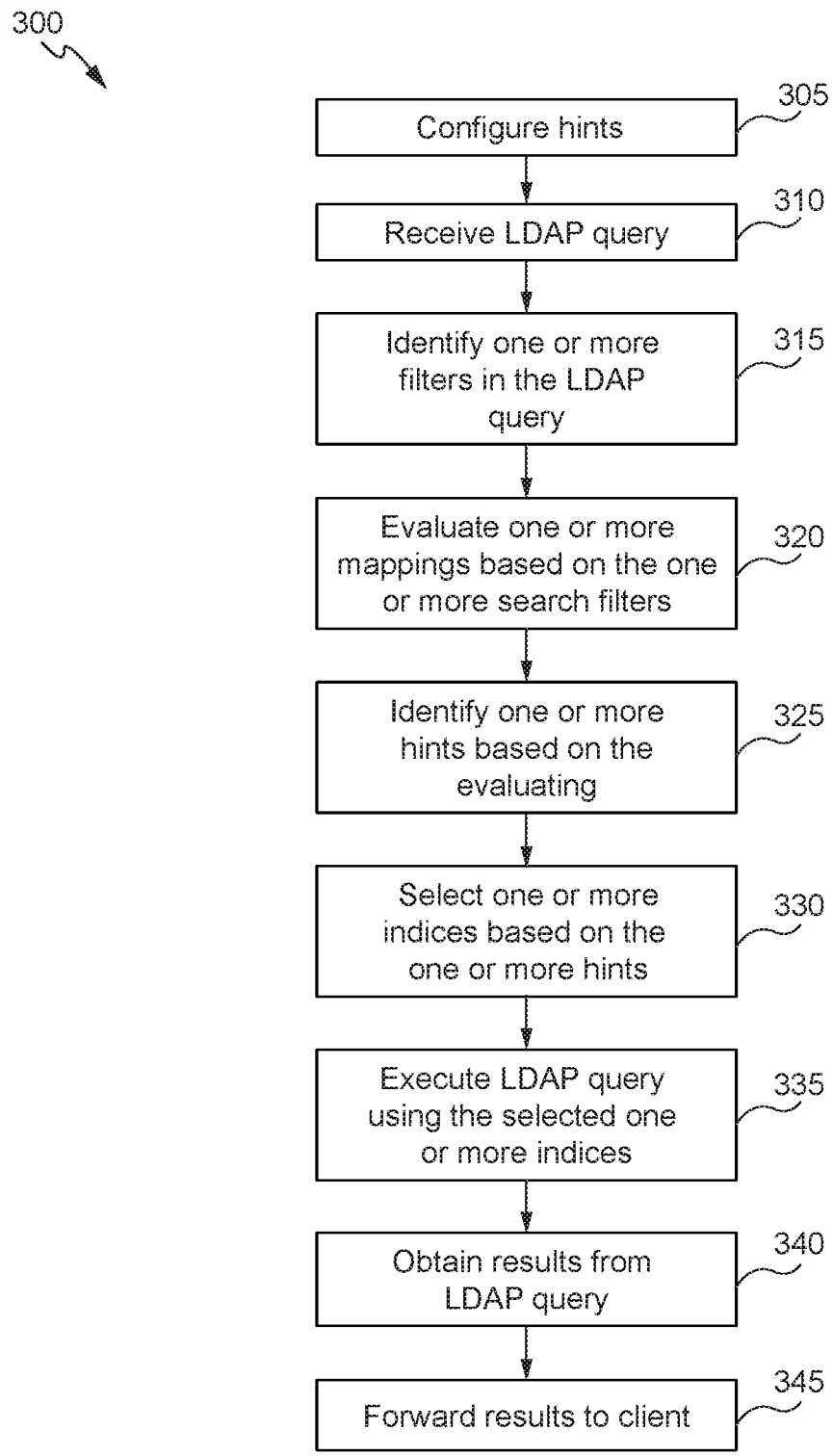
FIG. 3 depicts a LDAP search request process in accordance with various embodiments.

FIG. 3 illustrates a process and operation for smart index selection according to various embodiments. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted by in FIG. 3 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 3 is not intended to be limiting. Other sequences of steps may also be performed according to alternative embodiments. For example, in alternative embodiments the steps outlined above may be performed in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 3 shows a flowchart 300 that illustrates a process for smart index selection according to various embodiments. In some embodiments, the processes depicted in flowchart 300 may be implemented by the system of FIG. 1 and the framework of FIG. 2. At step 305, one or more hints for indices are configured by a data processing system such as directory server (e.g., the LDAP server 110 described with respect to FIG. 1). In some embodiments, the directory server provides mappings for search filter patterns to index hints through configurations. The mappings for search filter patterns to index hints can be configured as part of the directory server configuration by administrators. The mappings for search filter patterns to index hints may also be passed in runtime through a new filter to query hint LDAP control (assign hints programmatically in the code of the LDAP control). In some embodiments, the mappings for search filter patterns to index hints include the one or more hints and one or more search filter patterns. For example, the syntax of the configurations may include ds-cfg-query-hints: "one or more hints";\(\&\(one or more search filter patterns). At step 310, a LDAP query comprising search criteria is received by the data processing system. In some embodiments, the LDAP query is received from a client. In some embodiments, the search criteria includes one or more parameters such as a search base, a search scope, and a search filter. At step 315, one or more search filters are identified by the data processing system within the search criteria. The data processing system can interpret the value(s) of the one or more search filters to identify criteria that an LDAP directory entry should satisfy in order to be included in the search results.

At step 320, one or more mappings for search filter patterns to index hints are evaluated by the data processing system based on the identified one or more search filters. In some embodiments, the evaluating the one or more mappings comprises identifying one or more attribute values or substring values in the one or more search filters and matching the one or more attribute values or substring values to a search filter pattern of the one or more mappings. At step 325, one or more hints are identified by the data processing system based on the evaluation of the one or more mappings. The one or more hints are identified by the directory server using a mapping for the search filter pattern to one or more index hints. For example, the one or more hints are linked via coding to the search filter pattern of the one or more mappings evaluated in step 320.

At step 330, one or more indices are selected by the data processing system based on the identified one or more hints. In some embodiments, if query hints are present in the configuration layer and the search filter does not match a pattern associated with a query hint, then index selection choice is made from the conventional logic (e.g., sequentially or randomly). Alternatively, if query hints are present in the configuration layer and the search filter does match a pattern associated with a query hint, then index selection choice is made from the hint. Alternatively, if query hints are present in the configuration layer and the one or more search filters do match a pattern associated with a query hint and one or more search filters do not match a pattern associated with a query hint, then index selection choice is made based on a combination of the conventional logic and from the query hint. Alternatively, if query hints are not present in the configuration layer, then index selection choice is made from the conventional logic (e.g., sequentially or randomly). Alternatively, if query hints are not present in the configuration layer but LDAP control is modified automatically or by an administrator to implement a query hint and the search filter does match a pattern associated with a query hint, then index selection choice is made from the hint.

At step 335, the LDAP query is execute by the data processing system on an LDAP directory using the selected one or more indices. At step 340, results for the LDAP query based on the executing the LDAP query are obtained by the data processing system. The results may include one or more entries from the LDAP directory. At step 345, the results are sent or forwarded by the data processing system to a client.

EXAMPLES

Without intending to limit the scope of the embodiments discussed herein, the systems and methods implemented in various embodiments may be better understood by referring to the following examples.

Oracle's Unified Directory (OUD) ldapsearch CLI and searchrate performance monitoring tool (https://docs.oracle.com/cd/E19199-01/816-6400-10/srchrate.html) were used to run the following queries to measure the results. OUD ldapsearch exposes a debugging flag "debugsearchindex" that lists which indices were evaluated.

searchrate output displays the following.

Avg=average number of operations per thread during the interval (the total divided by the number of threads).

rate in parentheses=is the average number of searches per second for all threads (the total divided by the number of seconds in the interval).

total=number of search operations completed by all threads during the full interval.

Case 1
Query: Search for the user with a given user id and having a value for "cn" attribute.
Filter used: "(&(cn=*)(uid=user % d))" [% d is a random number substituted by searchrate]
[htanaya@s1c12amj bin]$ ./searchrate -p 38959 -D cn=dirmgr -w perftestPW123 -b 'dc=example,dc=com' -s sub -f "(&(cn=*)(uid=user % d))" -r 100 -K
The existing OUD code evaluated two indices selected sequentially from the filter.
Below is the searchrate output.
Avg r=624.00/thr (124.80/sec), total=624
Avg r=791.00/thr (158.20/sec), total=791
Avg r=864.00/thr (172.80/sec), total=864
Avg r=932.00/thr (186.40/sec), total=932
Avg r=1007.00/thr (201.40/sec), total=1007
Avg r=991.00/thr (198.20/sec), total=991

Results with LDAP code and systems in accordance with various embodiments: Same query is run with the revised LDAP code and system based on hints. Below are the results.
./searchrate -p 38959 -D cn=dirmgr -w perftestPW123 -b 'dc=example,dc=com' -s sub -f "(&(cn=*)(uid=user % d))" -r 100 -K
Avg r=1852.00/thr (370.40/sec), total=1852
Avg r=3180.00/thr (636.00/sec), total=3180
Avg r=4471.00/thr (894.20/sec), total=4471
Avg r=6415.00/thr (1283.00/sec), total=6415
Avg r=6558.00/thr (1311.60/sec), total=6558
Avg r=6678.00/thr (1335.60/sec), total=6678

Figure 4A:
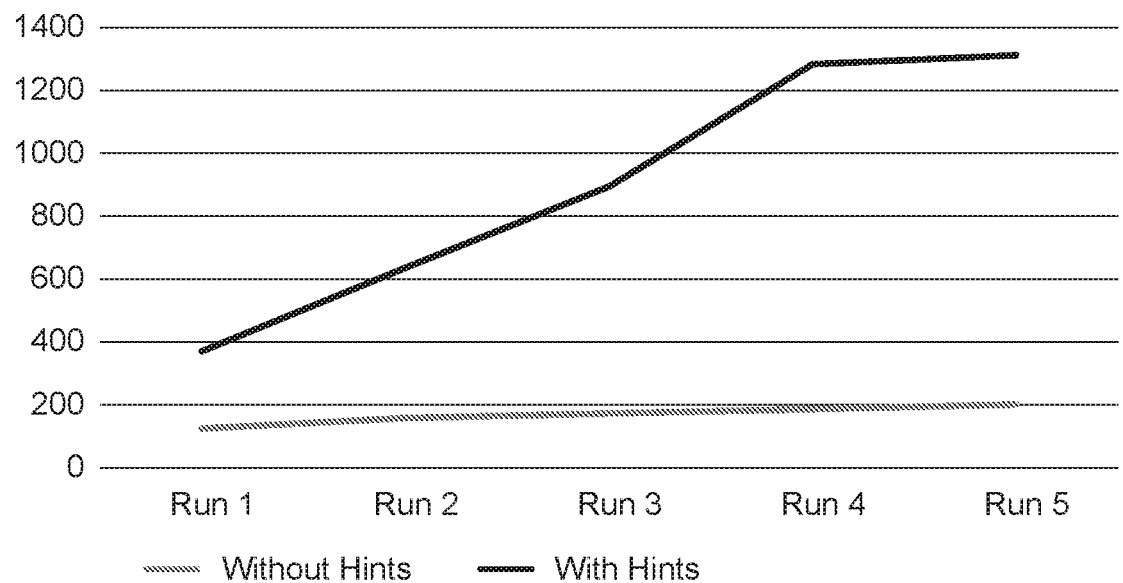
FIGS. 4A and 4B depict graphs that show improvement in query processing between query operations performed with and without hints in accordance with various embodiments.

The graph in FIG. 4A shows the comparison of the throughputs (number of operations per second for 5 of the above search rate runs) for the results without hints and with hints.

Case 2
Query: Search for the user with a given name starting with "sam" and is based in Sunnyvale or San Antonio.
Filter used: "(&(|(1=sunnyvale)(1=san antonio))(givenname=sam*))"
./searchrate -p 38959 -D cn=dirmgr -w perftestPW123 -b 'dc=example,dc=com' -s sub -f "(&(|(1=sunnyvale)(1=san antonio))(givenname=sam*))" -K
The existing OUD code evaluated three indices selected sequentially from the filter. Below is the searchrate output.
Avg r=1052.00/thr (210.40/sec), total=1052
Avg r=1560.00/thr (312.00/sec), total=1560
Avg r=1857.00/thr (371.40/sec), total=1857
Avg r=2063.00/thr (412.60/sec), total=2063
Avg r=2160.00/thr (432.00/sec), total=2160
Avg r=2353.00/thr (470.60/sec), total=2353

Results with the revised LDAP code and system in accordance with various embodiments.
Same query is run with the revised LDAP code and system based on hints. Below are the results.
./searchrate -p 38959 -D cn=dirmgr -w perftestPW123 -b 'dc=example,dc=com' -s sub -f "(&(|(1=sunnyvale)(1=san antonio))(givenname=sam*))" -K
Avg r=1986.00/thr (397.20/sec), total=1986
Avg r=3123.00/thr (624.60/sec), total=3123
Avg r=4277.00/thr (855.40/sec), total=4277
Avg r=6036.00/thr (1207.20/sec), total=6036
Avg r=6190.00/thr (1238.00/sec), total=6190
Avg r=6449.00/thr (1289.80/sec), total=6449

Figure 4B:
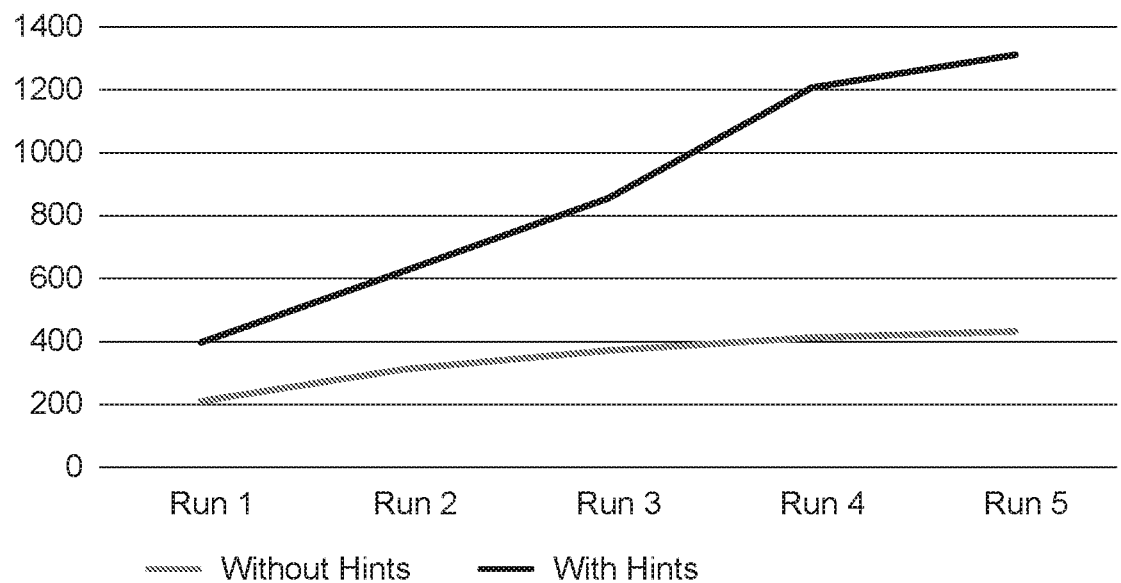

The graph in FIG. 4B shows the comparison of the throughputs (number of operations per second for 5 of the above search rate runs) for the results without hints and with hints.

The result from above cases confirms the fact that providing query hints in LDAP can improve the LDAP server's decision making process to pick optimal indices. This internally speeds up complex queries as less data is fetched and results in improved query performance.

Computing Environments

Figure 5:
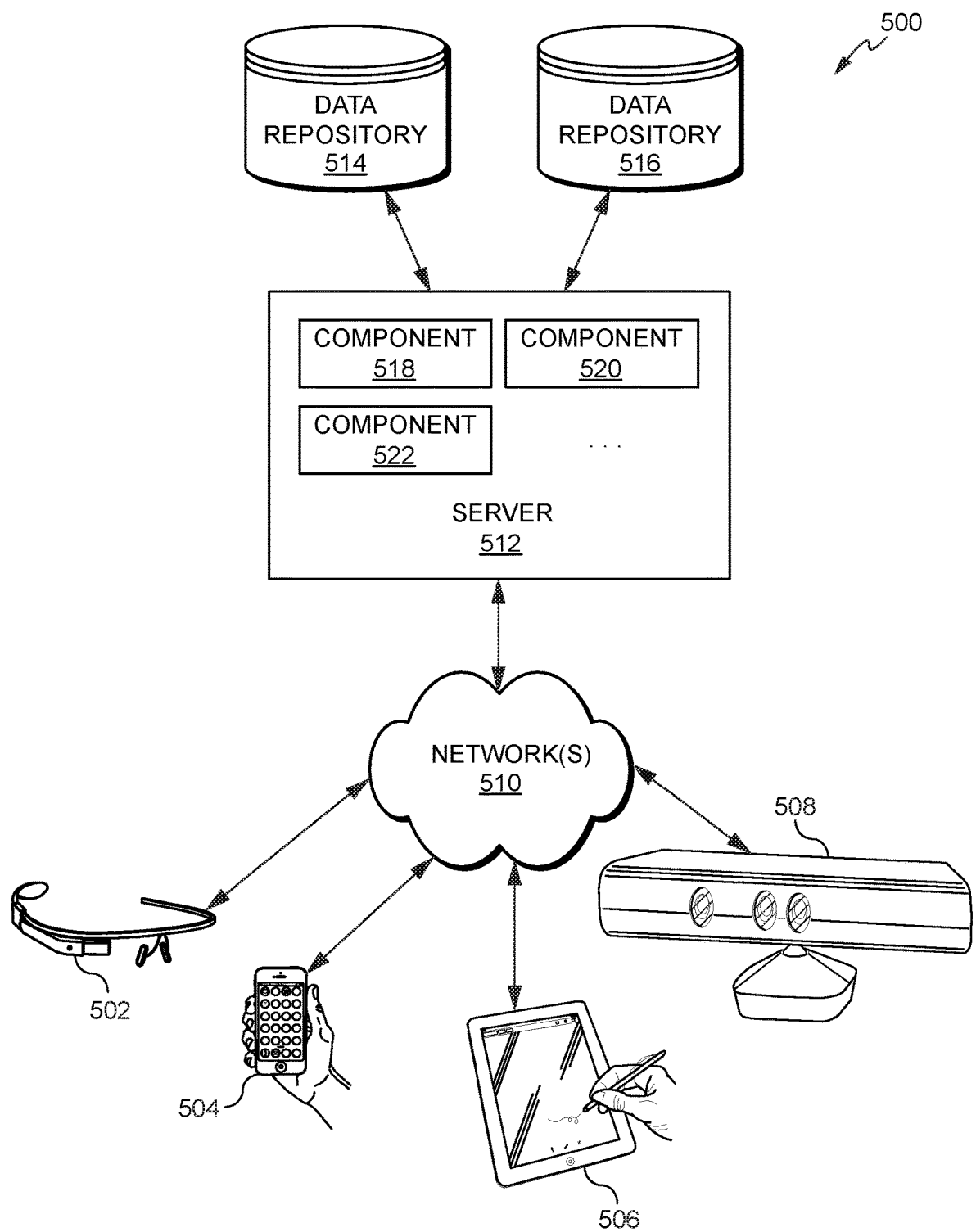
FIG. 5 depicts a simplified block diagram of a distributed system that may be used to implement various embodiments of the present disclosure.

FIG. 5 depicts a simplified diagram of a distributed system 500 for implementing an embodiment. In the illustrated embodiment, distributed system 500 includes one or more client computing devices 502, 504, 506, and 508, coupled to a server 512 via one or more communication networks 510. Clients computing devices 502, 504, 506, and 508 may be configured to execute one or more applications.

In various embodiments, server 512 may be adapted to run one or more services or software applications that enable improved query performance on an LDAP server.

In certain embodiments, server 512 may also provide other services or software applications that can include non-virtual and virtual environments. In some embodiments, these services may be offered as web-based or cloud services, such as under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, server 512 may include one or more components 518, 520 and 522 that implement the functions performed by server 512. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, and/or 508 to improved query performance on an LDAP server in accordance with the teachings of this disclosure. A client device may provide an interface that enables a user of the client device to interact with the client device. The client device may also output information to the user via this interface. Although FIG. 5 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 510 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 510 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization such as one or more flexible pools of logical storage devices that can be virtualized to maintain virtual storage devices for the server. In various embodiments, server 512 may be adapted to run one or more services or software applications that provide the functionality described in the foregoing disclosure.

The computing systems in server 512 may run one or more operating systems including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more data repositories 514, 516. These data repositories may be used to store data and other information in certain embodiments. For example, one or more of the data repositories 514, 516 may be used to store information for improving query performance on an LDAP server. Data repositories 514, 516 may reside in a variety of locations. For example, a data repository used by server 512 may be local to server 512 or may be remote from server 512 and in communication with server 512 via a network-based or dedicated connection. Data repositories 514, 516 may be of different types. In certain embodiments, a data repository used by server 512 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 514, 516 may also be used by applications to store application data. The data repositories used by applications may be of different types such as, for example, a key-value store repository, an object store repository, or a general storage repository supported by a file system.

Figure 6:
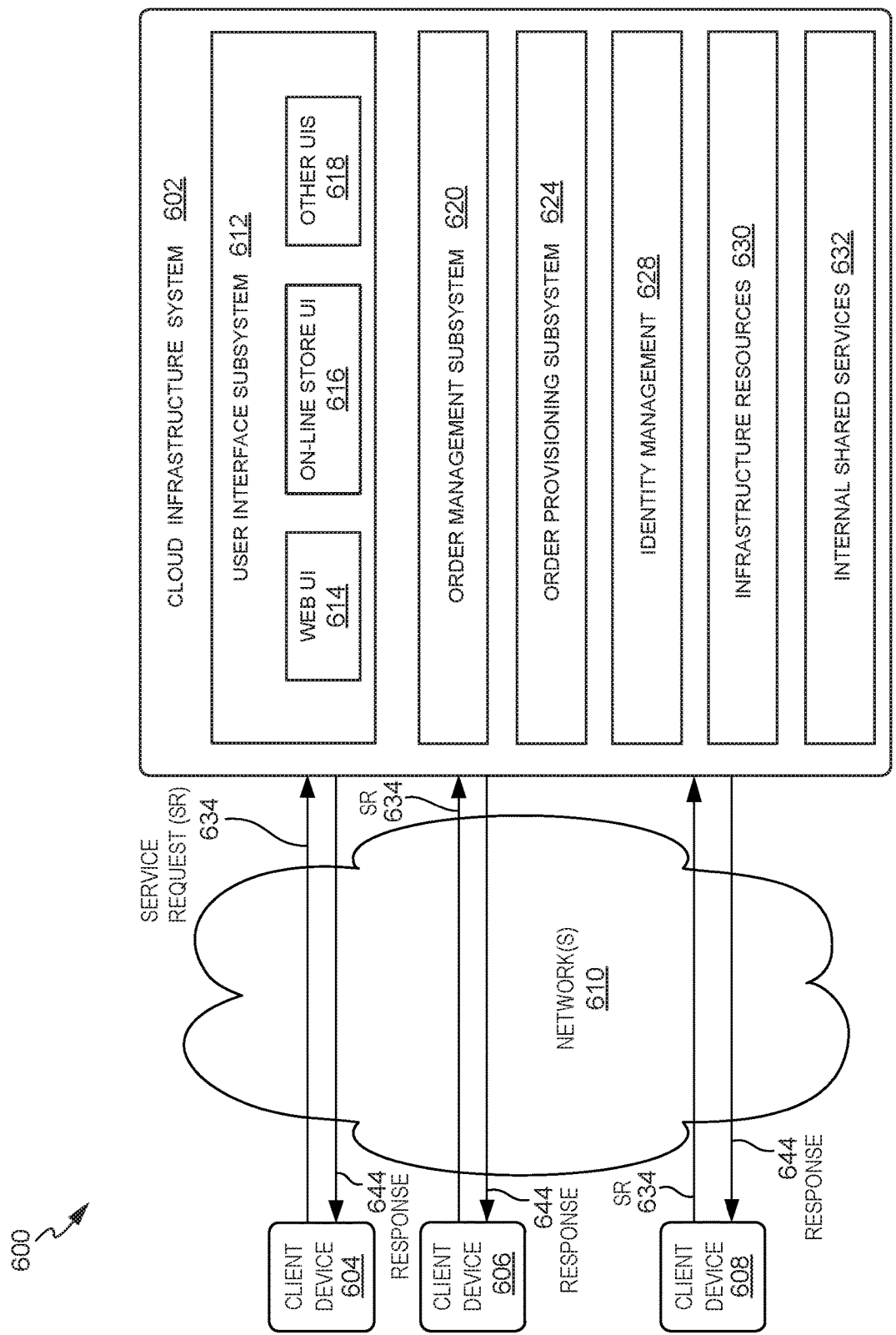
FIG. 6 depicts a simplified block diagram of one or more components of a system environment in which services may be offered as cloud services, in accordance with various embodiments.

In certain embodiments, the improved query performance on an LDAP server described in this disclosure may be offered as services via a cloud environment. FIG. 6 is a simplified block diagram of a cloud-based system environment in which the improved query performance on an LDAP server may be offered as cloud services, in accordance with certain embodiments. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 512. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other embodiments, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative embodiments.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 602 may provide one or more cloud services using different models such as under a Software as a Service (SaaS) model, a Platform as a Service (PaaS) model, an Infrastructure as a Service (IaaS) model, and others, including hybrid service models. Cloud infrastructure system 602 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 602. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 602. Cloud infrastructure system 602 then performs processing to provide the services requested in the customer's subscription order. For example, improving query performance on an LDAP server using statistics. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public customer, where the customer can be an individual or an enterprise. In certain other embodiments, under a private cloud model, cloud infrastructure system 602 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602. For example, a user may use a client device to request an improved query performance on an LDAP server described in this disclosure.

In some embodiments, the processing performed by cloud infrastructure system 602 for providing LDAP query services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for improving query performance on an LDAP server. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain embodiments, to facilitate efficient provisioning of these resources for supporting the various cloud services provided by cloud infrastructure system 602 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users or customers of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a customer may, using a client device, request (service request 634) one or more services provided by cloud infrastructure system 602 using one or more of interfaces 614, 616, and 618. For example, a customer may access the online store, browse cloud services offered by cloud infrastructure system 602, and place a subscription order for one or more services offered by cloud infrastructure system 602 that the customer wishes to subscribe to. The service request may include information identifying the customer and one or more services that the customer desires to subscribe to. For example, a customer may place a subscription order for an improved query performance service offered by cloud infrastructure system 602. As part of the order, the customer may provide information identifying complex and time-sensitive business scenarios to be solved.

In certain embodiments, such as the embodiment depicted in FIG. 6, cloud infrastructure system 602 may comprise an order management subsystem (OMS) 620 that is configured to process the new order. As part of this processing, OMS 620 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 602 may send a response or notification 644 to the requesting customer to indicate when the requested service is now ready for use. In some instances, information (e.g., a link) may be sent to the customer that enables the customer to start using and availing the benefits of the requested services. In certain embodiments, for a customer requesting an improved query performance service, the response may include a notification that statistics have been collected for an improved query performance or the response may include results of a LDAP query.

Cloud infrastructure system 602 may provide services to multiple customers. For each customer, cloud infrastructure system 602 is responsible for managing information related to one or more subscription orders received from the customer, maintaining customer data related to the orders, and providing the requested services to the customer. Cloud infrastructure system 602 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 602 may provide services to multiple customers in parallel. Cloud infrastructure system 602 may store information for these customers, including possibly proprietary information. In certain embodiments, cloud infrastructure system 602 comprises an identity management subsystem (IMS) 628 that is configured to manage customers information and provide the separation of the managed information such that information related to one customer is not accessible by another customer. IMS 628 may be configured to provide various security-related services such as identity services, such as information access management, authentication and authorization services, services for managing customer identities and roles and related capabilities, and the like.

Figure 7:
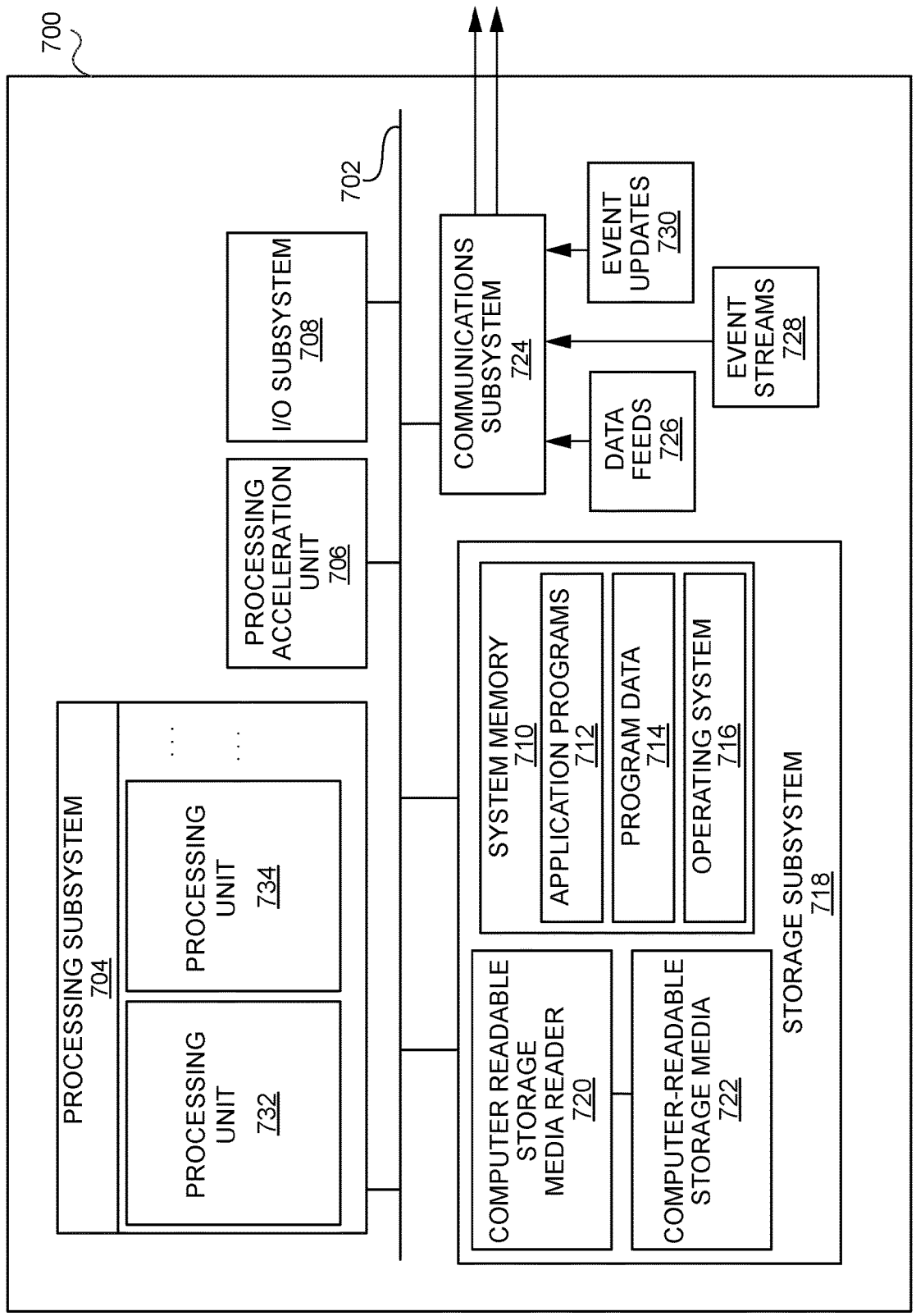
FIG. 7 depicts an exemplary computer system that may be used to implement various embodiments of the present disclosure.

FIG. 7 illustrates an exemplary computer system 700 that may be used to implement certain embodiments. For example, in some embodiments, computer system 700 may be used to implement any of the LDAP query processing systems, LDAP systems, and various servers and computer systems described above. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain embodiments, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some embodiments. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some embodiments. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 718 may also include a computer-readable storage media reader 720 that can further be connected to computer-readable storage media 722. Reader 720 may receive and be configured to read data from a memory device such as a disk, a flash drive, etc.

In certain embodiments, computer system 700 may support virtualization technologies, including but not limited to virtualization of processing and memory resources. For example, computer system 700 may provide support for executing one or more virtual machines. In certain embodiments, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, the communication subsystem may be used to obtain statistics for improved query performance.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
receiving, by a data processing system, a Lightweight Directory Access Protocol (LDAP) query comprising search criteria;
identifying, by the data processing system, one or more search filters within the search criteria;
evaluating, by the data processing system, one or more mappings between search filter patterns and index query hints based on the identified one or more search filters, wherein the evaluating comprises identifying one or more attribute values or substring values in the one or more search filters and determining whether the one or more attribute values or sub string values match to the search filter patterns of the one or more mappings;
when the one or more attribute values or sub string values match to the search filter patterns of the one or more mappings, identifying, by the data processing system, one or more query hints based on the evaluation of the one or more mappings, wherein the identifying comprises using the one or more mappings between the search filter patterns and the index query hints to identify the one or more query hints;
selecting, by the data processing system, one or more indices based on the one or more query hints, wherein the one or more query hints identify for the data processing system the one or more indices to be selected for the identified one or more search filters; and
executing, by the data processing system, the LDAP query on an LDAP directory using the selected one or more indices.

2. The method of claim 1, further comprising configuring, by the data processing system, the one or more query hints for the one or more indices, wherein the one or more query hints are linked via coding to the search filter pattern of the mapping.

3. The method of claim 2, further comprising:
obtaining, by the data processing system, results for the LDAP query based on the executing the LDAP query, wherein the results include one or more entries from the LDAP directory; and
forwarding, by the data processing system, the results to a client.

4. The method of claim 3, wherein the configuring is performed at design time as part of the data processing system configuration by an administrator or machine learning component.

5. The method of claim 3, wherein the configuring is performed at run time by assigning hint programmatically in code of an LDAP control portion of the data processing system by an administrator or machine learning component.

6. A system comprising:
a Lightweight Directory Access Protocol (LDAP) system that includes one or more processors and non-transitory machine readable storage medium having instructions stored thereon that when executed by the one or more processors cause the one or more processors to perform a process comprising:
receiving, by a LDAP server, a LDAP query comprising search criteria;
identifying, by the LDAP server, one or more search filters within the search criteria;
evaluating, by the LDAP server, one or more mappings between search filter patterns and index query hints based on the identified one or more search filters, wherein the evaluating comprises identifying one or more attribute values or substring values in the one or more search filters and determining whether the one or more attribute values or sub string values match to the search filter patterns of the one or more mappings;
when the one or more attribute values or sub string values match to the search filter patterns of the one or more mappings, identifying, by the LDAP server, one or more query hints based on the evaluation of the one or more mappings, wherein the identifying comprises using the one or more mappings between the search filter patterns and the index query hints to identify the one or more query hints;
selecting, by the LDAP server, one or more indices based on the one or more query hints, wherein the one or more query hints identify for the data processing system the one or more indices to be selected for the identified one or more search filters; and
executing, by the LDAP server, the LDAP query on an LDAP directory using the selected one or more indices.

7. The system of claim 6, wherein the process further comprises configuring, by the LDAP system, the one or more query hints for the one or more indices, wherein the one or more query hints are linked via coding to the search filter pattern of the mapping.

8. The system of claim 7, wherein the process further comprises:

obtaining, by the LDAP server, results for the LDAP query based on the executing the LDAP query, wherein the results include one or more entries from the LDAP directory; and forwarding, by the LDAP server, the results to a client.

9. The system of claim 8, wherein the configuring is performed at design time as part of the LDAP system configuration by an administrator or machine learning component.

10. The system of claim 8, wherein the configuring is performed at run time by assigning hint programmatically in code of an LDAP control portion of the LDAP system by an administrator or machine learning component.

11. A non-transitory machine readable storage medium having instructions stored thereon that when executed by one or more processors cause the one or more processors to perform a method comprising:

receiving a LDAP query comprising search criteria;

identifying one or more search filters within the search criteria;

evaluating one or more mappings between search filter patterns and index query hints based on the identified one or more search filters, wherein the evaluating comprises identifying one or more attribute values or substring values in the one or more search filters and determining whether the one or more attribute values or sub string values match to the search filter patterns of the one or more mappings;

when the one or more attribute values or sub string values match to the search filter patterns of the one or more mappings, identifying one or more query hints based on the evaluation of the one or more mappings, wherein the identifying comprises using the one or more mappings between the search filter patterns and the index query hints to identify the one or more query hints;

selecting one or more indices based on the one or more query hints, wherein the one or more query hints identify for the data processing system the one or more indices to be selected for the identified one or more search filters; and executing the LDAP query on an LDAP directory using the selected one or more indices.

12. The non-transitory machine readable storage medium of claim 11, wherein the method further comprises:

configuring the one or more query hints for the one or more indices, wherein the one or more query hints are linked via coding to the search filter pattern of the mapping;

obtaining results for the LDAP query based on the executing the LDAP query, wherein the results include one or more entries from the LDAP directory; and forwarding the results to a client.

13. The non-transitory machine readable storage medium of claim 12, wherein the configuring is performed at design time as part of a LDAP system configuration by an administrator or machine learning component.

14. The non-transitory machine readable storage medium of claim 12, wherein the configuring is performed at run time by assigning hint programmatically in code of an LDAP control portion of a LDAP system by an administrator or machine learning component.

\* \* \* \* \*

UNITED STATES PATENT AND TRADEMARK OFFICE
CERTIFICATE OF CORRECTION

PATENT NO. : 10,868,793 B2  
APPLICATION NO. : 16/204433  
DATED : December 15, 2020  
INVENTOR(S) : Tanaya et al.

Page 1 of 1

It is certified that error appears in the above-identified patent and that said Letters Patent is hereby corrected as shown below:

On the Title Page

Item (56), Column 2, under Other Publications, Line 1, delete "Cranshaw ," and insert -- Cranshaw, --, therefor.

In the Specification

In Column 6, Line 55, delete "singleLeve" and insert -- singleLevel --, therefor.

In Column 6, Line 57, delete "wholeSubstree" and insert -- wholeSubtree --, therefor.

In Column 6, Line 59, delete "suboridnateSubtree" and insert -- subordinateSubtree --, therefor.

In Column 9, Line 13, delete "component" and insert -- component. --, therefor.

In Column 21, Line 49, delete "Google)" and insert -- Google --, therefor.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*